US008792946B2

(12) United States Patent
Nakagawa et al.

(10) Patent No.: US 8,792,946 B2
(45) Date of Patent: *Jul. 29, 2014

(54) ELECTRONIC CIRCUIT AND RADIO COMMUNICATIONS SYSTEM

(71) Applicants: Tatsuo Nakagawa, Kokubunji (JP); Masayuki Miyazaki, Tokyo (JP)

(72) Inventors: Tatsuo Nakagawa, Kokubunji (JP); Masayuki Miyazaki, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/651,706

(22) Filed: Oct. 15, 2012

(65) Prior Publication Data
US 2013/0040590 A1  Feb. 14, 2013

Related U.S. Application Data

(62) Division of application No. 12/611,350, filed on Nov. 3, 2009, now Pat. No. 8,326,243.

(30) Foreign Application Priority Data

Nov. 4, 2008  (JP) ................................. 2008-282808

(51) Int. Cl.
*H01Q 11/12* (2006.01)
*H04B 1/04* (2006.01)
*H04B 1/16* (2006.01)
*H04B 1/38* (2006.01)

(52) U.S. Cl.
USPC ..................... 455/572; 455/127.1; 455/343.1; 455/574

(58) Field of Classification Search
USPC .......... 455/127.1, 127.4–127.5, 343.1–343.5, 455/572–574
See application file for complete search history.

(56) References Cited

U.S. PATENT DOCUMENTS

| 4,419,765 | A | * | 12/1983 | Wycoff et al. ............... 340/7.35 |
| 4,710,842 | A | | 12/1987 | Suzuki et al. |
| 5,487,181 | A | | 1/1996 | Dailey et al. |
| 6,000,035 | A | | 12/1999 | Matsushima et al. |
| 6,219,564 | B1 | * | 4/2001 | Grayson et al. ............... 455/574 |

(Continued)

FOREIGN PATENT DOCUMENTS

JP  9-128106 A  5/1997

OTHER PUBLICATIONS

S. Yamashita et al.; A 15× 15 mm, 1 μA, Reliable Sensor-Net Module: Enabling Application-Specific Nodes; Information Processing in Sensor Networks, 2006. vol., No., pp. 383-390, Apr. 19-21, 2006.

*Primary Examiner* — Simon Nguyen
(74) *Attorney, Agent, or Firm* — Mattingly & Malur, PC

(57) ABSTRACT

The electronic circuit includes: a micro controller unit; a timer operable to measure a standby time of the micro controller unit; a buffer circuit connected with an output-signal terminal of the timer; a logic circuit controlled by an output signal of the timer and an output signal of the micro controller unit; and a power-on switch controlled by the logic circuit. The buffer circuit has no protection diode connected with an input terminal thereof on a power-source side, and connected to a common power source shared with the micro controller unit. The switch is one for controlling the power source of the micro controller unit and buffer circuit. The micro controller unit is made to transition to an active state to either a standby state or a power-source cutoff state during the standby time.

6 Claims, 10 Drawing Sheets

(56) References Cited

U.S. PATENT DOCUMENTS

| | | | |
|---|---|---|---|
| 7,305,259 B1* | 12/2007 | Malone et al. | 455/574 |
| RE40,032 E* | 1/2008 | van Bokhorst et al. | 455/343.2 |
| 7,957,488 B2* | 6/2011 | Hiramoto | 375/316 |
| 2002/0055345 A1* | 5/2002 | Wood, Jr. | 455/277.1 |
| 2004/0077383 A1* | 4/2004 | Lappetelainen et al. | 455/574 |
| 2005/0258949 A1* | 11/2005 | Iwazumi | 340/442 |
| 2006/0019695 A1 | 1/2006 | Miyazaki et al. | |
| 2006/0223486 A1 | 10/2006 | Ruff et al. | |
| 2007/0111671 A1* | 5/2007 | Baumgartner et al. | 455/69 |
| 2007/0213028 A1* | 9/2007 | Shohara et al. | 455/343.1 |
| 2012/0178491 A1* | 7/2012 | Tsai | 455/517 |

\* cited by examiner

Fig.5
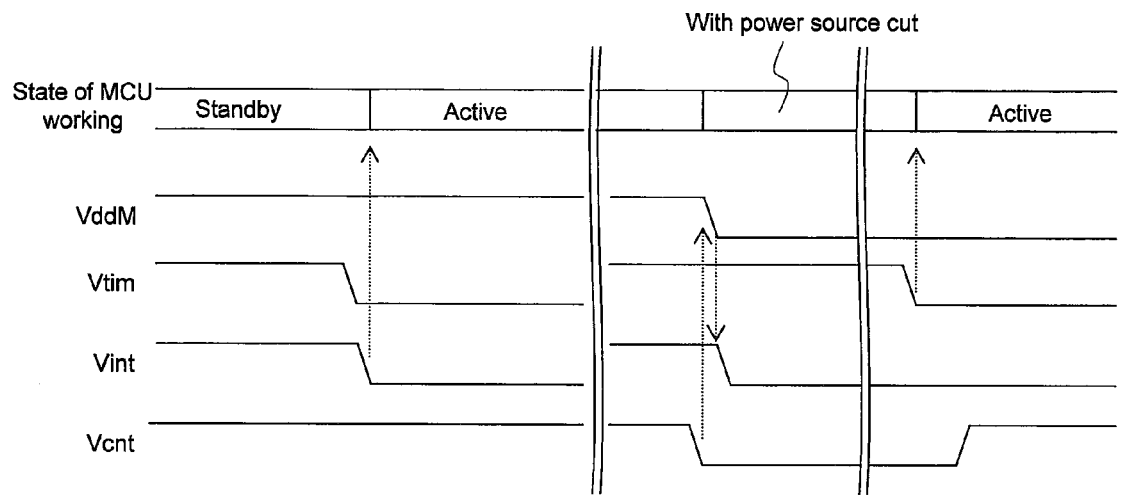
Fig.6
| Vtim | Vcnt | Switch | MCU working state |
|------|------|--------|-------------------|
| Lo | Lo | ON | In action |
| Lo | Hi | ON | In action |
| Hi | Lo | OFF | With Power source cut |
| Hi | Hi | ON | on Standby |
Fig.7
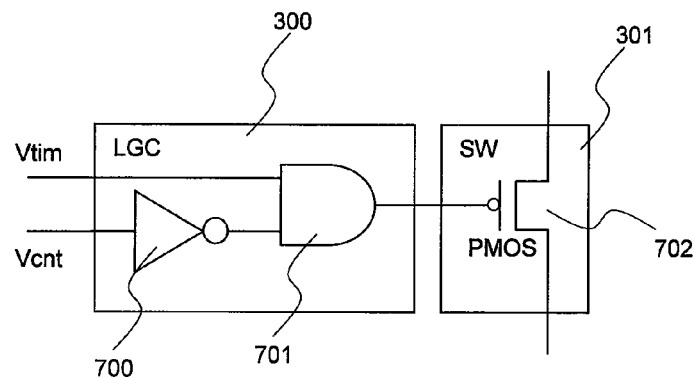

| Vwup | Vtim | Vcnt | Switch | State of MCU working |
|------|------|------|--------|----------------------|
| 0 | D.C. | D.C. | ON | In action |
| 1 | 0 | 0 | ON | In action |
| 1 | 0 | 1 | ON | In action |
| 1 | 1 | 0 | OFF | With Power source cut |
| 1 | 1 | 1 | ON | On standby |

ELECTRONIC CIRCUIT AND RADIO COMMUNICATIONS SYSTEM

CLAIM OF PRIORITY

This application is a divisional of U.S. patent application Ser. No. 12/611,350, filed Nov. 3, 2009, which claims priority to Japanese application JP 2008-282808, filed Nov. 4, 2008, the content of which is hereby incorporated by reference into this application.

FIELD OF THE INVENTION

The present invention relates to a radio communication system and an electronic circuit used therefor. Particularly, it relates to Sensor Net, which is a kind of radio communication system, a sensor node used as a radio communication device for Sensor Net, and a control circuit used for the sensor node.

BACKGROUND OF THE INVENTION

In recent years, there has been an increase in research and development about a radio communication system, hereinafter referred to as "Sensor Net", in which a terminal having a sensor and radio or wireless communication function, hereinafter referred to as "sensor node", is used to capture various information pieces of the real world into an information processing device in real time. Sensor nodes are placed everywhere and set on everything, and information pieces gathered by the sensors are sent to a network. The data so gathered are processed into various forms, and fed back to the real world. Such Sensor Net has been under consideration about applications to various fields such as logistics, healthcare, and quality control.

To set a sensor node without the need for selecting where to put it, the network connection through a wireless communication and the downsizing thereof are de rigueur. However, a compact-size sensor node is restricted in the capacity of its battery. Hence, taking into account the operational cost including the replacement of a battery, to reduce its power becomes a challenge. For example, Non-patent Document presented by Yamashita, S. et al., "A 15×15 mm, 1 µA, reliable sensor-net module: enabling application-specific nodes," Information Processing in Sensor Networks, 2006. vol., no., pp. 383-390, 19-21 Apr. 2006, discloses a technique for performing the power reduction by bringing a micro controller unit, hereinafter referred to as "MCU", to its standby state, and using a timer placed outside MCU to restore it.

In addition, lots of researches on the reduction in power consumption of electronic devices have been made. For instance, Japanese Unexamined Patent Application Publication No. JP-A-9-128106 discloses a central processing unit (CPU) having three operation modes, i.e. a normal mode, a power-saving mode lower in power consumption in comparison to the normal mode, and a stop mode in which an action is stopped completely.

SUMMARY OF THE INVENTION

Many of sensor nodes which are terminals designed for Sensor Net are driven by batteries during use. As Sensor Net uses a number of sensor nodes, it is required to cut the cost of maintenance thereof. Therefore, sensor nodes need to have a long battery life. In other words, it is essential to achieve a lower power consumption of sensor nodes. For this purpose, according to the above Non-patent Document presented by Yamashita, S. et al., MCU is made to transition to its standby state, and a timer outside MCU is used to restore it, whereby the power consumption is reduced. Conventionally, a relatively low-spec MCU has been used for a sensor node, which can be put in a condition of low power consumption when made to transition to the standby state. The standby state of MCU refers to a condition where MCU remains stopping supply of the synchronizing operation clock to a certain internal circuit such as CPU by e.g. executing a standby command.

As the development of Sensor Net proceeds, a conventional relatively low-spec MCU becomes insufficient in performance, and the number of applications which need high-performance MCU is increasing. An example of such applications is an application software program which handles a large volume of data. Such application software program requires a sensor node to compress data, and therefore it needs MCU of a relatively high performance. Further, in some cases, MCU of a relatively high performance is needed for encryption of data in terms of security. However, even in the case where a high-performance MCU like this is required, there is still the demand for reduction of power consumption. In the case of using a high-performance MCU, even if MCU is made to transition to the standby state as in the past, sometimes the effect of reduction of power consumption cannot be achieved sufficiently because of a large current leakage. In addition, the scaling down of semiconductor manufacturing processes is going ahead with each passing year. For example, in the case of using MCU fabricated by a manufacturing process designed for fine semiconductors, the amount of a leak current in the standby state is becoming unignorable. Therefore, required is a means for reducing power consumption unlike the conventional method by which MCU is made to transition to the standby state. For example, such means is selectively cutting the power supply to MCU instead of making it transition to the steady state.

However, cutting the power supply to MCU can cause for example, in a condition such that the level of an external input terminal is unstable, an undesired current leakage toward a node of the power supply system subjected to the cutting of power supply through an input-protection circuit provided corresponding to the external input terminal. Particularly, the study by the inventor showed that in the case of using a common timer interrupt signal for disabling the standby and the cut of power supply, directly supplying an interrupt signal to an interrupt terminal can cause a leak current as described above regardless of whether the interrupt signal is High-enable or Low-enable one. Specifically, using a Low-enable timer interrupt signal can cause current to leak during a period in which the interrupt signal stays at High level under the condition where the power supply is cut. In the case of using a High-enable timer interrupt signal, supplying the interrupt signal to an interrupt terminal can also cause current to leak between the time the cut of power source is disabled by the timer interrupt signal of High level, and the time the power supply is stabilized.

It is an object of the invention to provide an electronic circuit which can select the stop of power supply instead of the transition of a micro controller unit to the standby state, and which can prevent the occurrence of unwanted current leakage in the condition of stopped power supply.

Further, it is an object of the invention to provide an electronic circuit in which the condition of standby and the condition of stopped power supply can be disabled by a common signal.

The above and other objects of the invention and novel features thereof will be apparent from the description hereof and the accompanying drawings.

Of the invention herein disclosed, the preferred embodiments will be outlined below briefly.

An electronic circuit in connection with the invention includes: a micro controller unit; a timer operable to measure a standby time of the micro controller unit; a buffer circuit connected with a signal output terminal of the timer; a logic circuit controlled by output signals from the timer and micro controller unit; and a switch controlled by the logic circuit. The buffer circuit has no protection diode connected to an input terminal thereof on the power-source side. The buffer circuit is connected to a common power source shared with the micro controller unit. The switch is a switch for controlling the power source of the micro controller unit and buffer circuit. The micro controller unit can be made to transition from an active state thereof to either a standby state or a power-source cutoff state during the standby time, and restored from the one of the standby and power-source cutoff states to the active state according to an output from the buffer.

Now, the effects achieved by the preferred embodiments of the invention herein disclosed will be described below briefly.

The first effect is it is possible to select the stop of power supply instead of making a micro controller unit transition to its standby state. The second is an unwanted current leakage can be prevented from being caused in the condition of stopped power supply.

BRIEF DESCRIPTION OF THE DRAWINGS

FIG. 5 is a timing chart of actions of the sensor node;

FIG. 6 is a table for explaining truth values in connection with the control circuit of FIG. 4;

FIG. 7 is a diagram showing specific examples of a logic circuit and a switch included in the control circuit of FIG. 4;

FIG. 11 is a timing chart of the control circuit shown in FIG. 10 at power-on;

DETAILED DESCRIPTION OF THE PREFERRED EMBODIMENTS

1. Summary of the Preferred Embodiments

Figure 1:
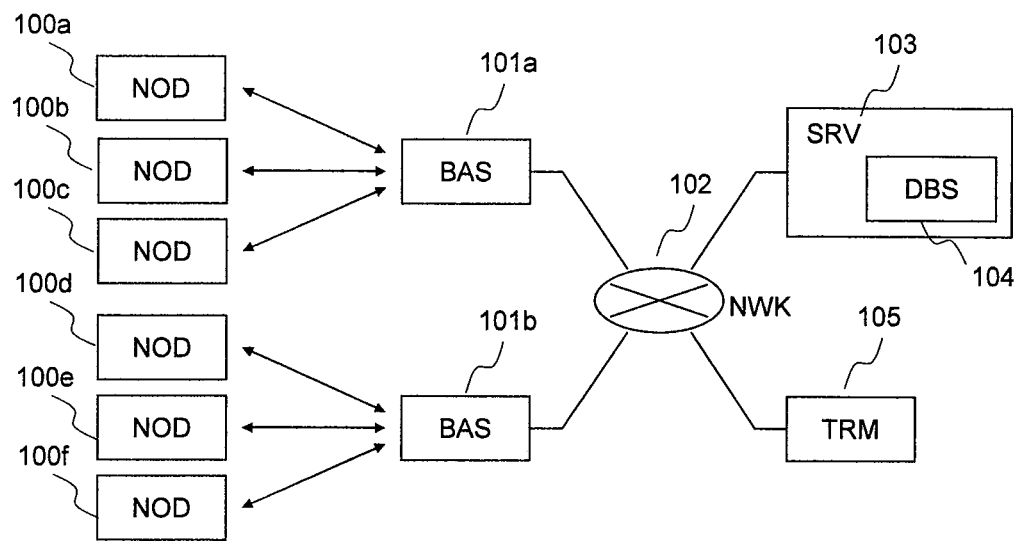
FIG. 1 is a block diagram showing a sensor net system according to an example of a radio communication system in connection with the invention.

The preferred embodiments of the invention herein disclosed will be outlined first. Here, the reference numerals, characters and signs for reference to the drawings, which are accompanied with paired round brackets, only exemplify what the concepts of components and elements referred to by the numerals, characters and signs contain.

[1] An electronic circuit in connection with the invention includes: a micro controller unit (200); a timer (203) for measuring a standby time under the control of the micro controller unit; a buffer circuit (302) which receives an output signal of the timer; a logic circuit (300) controlled by the output signal (Vtim) of the timer, and an output signal (Vcnt) of the micro controller unit; and a power-on switch (301) controlled by the logic circuit in switching, and operable to supply a power source to the micro controller unit and buffer circuit. The buffer circuit does not have a protection diode connected with its input terminal on a power-source side. The micro controller unit is made to transition from an active state thereof to one of standby and power-source cutoff states during the standby time, and the micro controller unit is restored from the standby or power-source cutoff state to the active state according to an output from the buffer.

[2] In the electronic circuit as described in [1], the micro controller unit decides to transition to the standby state or the power-source cutoff state based on a length of the standby time set on the timer.

[3] In the electronic circuit as described in [1], a signal for directing the micro controller unit to be restored to the active state after the micro controller unit has transitioned to the standby state, and a signal for directing the micro controller unit to be restored to the active state after the micro controller unit has transitioned to the power-source cutoff state are identical signals (Vtim), and output by the timer.

[4] In the electronic circuit as described in [1], the logic circuit switches the output signal (Vcnt) of the micro controller unit from High to Low level, thereby to turn off the power-on switch, and to cut a power source of the micro controller unit and buffer circuit. The logic circuit turns on the power-on switch to power on the micro controller unit and buffer circuit in response to changeover of the output signal (Vtim) of the timer from High to Low level.

[5] In the electronic circuit as described in [4], after having transitioned from the active state to the standby state, the micro controller unit is restored to the active state in response to changeover of the output signal of the timer from High to Low level.

[6] In the electronic circuit as described in [1], the micro controller unit inputs, through its interrupt terminal, the output signal of the buffer for restoration from the standby state to the active state.

[7] In the electronic circuit as described in [1], the buffer circuit has a protection diode between the input terminal and a ground terminal.

[8] The electronic circuit as described in [1] further includes an activation circuit (1001) connected with the logic circuit. The activation circuit remains waiting for a predetermined length of time after its power-on, and then changes its output. The logic circuit keeps the power-on switch ON until the activation circuit changes its output regardless of states of outputs from the micro controller unit and timer.

[9] The electronic circuit as described in [1] further includes a connector (1704) for debug, which enables supply of a signal for forcing the power-on switch to shift into ON state.

[10] An electronic circuit in another aspect of the invention includes: a micro controller unit; a timing-generation sensor (1900) operable to output a certain detection result; a buffer circuit which accepts an output of the timing-generation sensor; a logic circuit controlled by the output signal of the timing-generation sensor and an output of the micro controller unit; and a power-on switch controlled by the logic circuit in switching, and operable to supply a power source to the micro controller unit and buffer circuit. The buffer circuit has no protection diode connected to an input terminal thereof on a power-source side. The micro controller unit is made to transition from an active state thereof to one of standby and power-source cutoff states by the time that the timing-generation sensor outputs the certain detection result, and restored from the one of the standby and power-source cutoff states to the active state according to an output from the buffer.

[11] An electronic circuit in still another aspect of the invention includes: a micro controller unit; a timer operable to measure a standby time under control of the micro controller unit; a buffer circuit operable to receive an output signal of the timer; a logic circuit controlled by the output signal of the timer and an output signal of the micro controller unit; a first regulator (1602) controlled by the logic circuit in its activation, and operable to supply a power source to the micro controller unit and buffer circuit; and a second regulator (1601) operable to supply a power source to the timer and logic circuit. The buffer circuit has no protection diode connected to an input terminal thereof on a power-source side. The micro controller unit is made to transition from an active state thereof to one of standby and power-source cutoff states during the standby time, and restored from the one of the standby and power-source cutoff states to the active state according to an output from the buffer.

[12] The electronic circuit as described in [1] further has: a sensor (204); a radio communication unit (201); and a power-on switch (206) for radio communication, operable to control a power source of the radio communication unit. The power-on switch for radio communication is controlled by the micro controller unit. The radio communication unit transmits data from the sensor under control of the micro controller unit.

[13] A radio communication system according to the invention has a plurality of radio communication devices (100), and a host device (101) which communicates with and manages the plurality of radio communication devices, provided that at least one of the plurality of radio communication devices is the electronic circuit described in [12].

[14] The electronic circuit as described in [10] further includes a sensor (204); a radio communication unit (201), and a power-on switch (206) for radio communication, operable to control a power source of the radio communication unit. The power-on switch for radio communication is controlled by the micro controller unit. The radio communication unit transmits data from the sensor under control of the micro controller unit.

[15] A radio communication system according to the invention has a plurality of radio communication devices (100), and a host device (101) which communicates with and manages the plurality of radio communication devices, provided that at least one of the plurality of radio communication devices is the electronic circuit described in [14].

[16] The electronic circuit as described in [11] further includes: a sensor (204); a radio communication unit (201); and a power-on switch (206) for radio communication, operable to control a power source of the radio communication unit. The power-on switch for radio communication is controlled by the micro controller unit. The radio communication unit transmits data from the sensor under control of the micro controller unit.

[17] A radio communication system according to the invention has a plurality of radio communication devices (100), and a host device (101) which communicates with and manages the plurality of radio communication devices, provided that at least one of the plurality of radio communication devices is the electronic circuit described in [16].

[18] A radio communication system according to the invention includes: a radio communication terminal; a base station operable to communicate with the radio communication terminal by radio; a server operable to process data passed from the radio communication terminal through the base station. In radio communication system, the radio communication terminal includes: a sensor operable to capture data; a radio communication device operable to transmit data captured by the sensor to the base station; a micro controller unit operable to control the radio communication device; a timer operable to measure a standby time set by the micro controller unit; a buffer circuit operable to receive an output signal of the timer; a logic circuit controlled by an output signal of the timer and an output signal of the micro controller unit; and a power-on switch controlled by the logic circuit in switching, and operable to supply a power source to the micro controller unit and buffer circuit. Further, the buffer circuit has no protection diode connected to an input terminal thereof on a power-source side. Besides, the micro controller unit is made to transition from an active state thereof to one of standby and power-source cutoff states during the standby time, and restored from the one of the standby and power-source cutoff states to the active state according to an output from the buffer. In the active state, the micro controller unit controls the radio communication device to transmit data captured by the sensor to the base station.

[19] In the radio communication system as described in [18], the micro controller unit decides to transition to the standby state or the power-source cutoff state based on a length of the standby time set on the timer.

[20] In the radio communication system as described in [18], a signal for directing the micro controller unit to be restored to the active state after the micro controller unit has transitioned to the standby state and a signal for directing the micro controller unit to be restored to the active state after the micro controller unit has transitioned to the power-source cutoff state are identical signals, and output by the timer.

2. Further Detailed Description of the Preferred Embodiments

Now, the embodiments will be described further in detail. The detailed descriptions about forms for carrying out the invention will be presented below based on the drawings. It is noted that as to all the drawings to which reference is made in describing the forms for carrying out the invention, the members or parts having identical functions are identified by the same reference numeral or character, and the repeated description thereof is omitted herein.

<<First Embodiment>>

The first embodiment of the invention will be described with reference to FIGS. 1 to 9. FIG. 1 shows a configuration of a sensor net system, which is an example of the radio communication system in connection with the invention. The sensor net system includes: sensor nodes (NOD) 100a, 100b, 100c, 100d, 100e, 100f and so forth; base stations (BAS) 101a and 101b; a network (NWK) 102; a server (SRV) 103; and a terminal (TRM) 105. The server 103 includes a database (DBS) 104. Incidentally, the subscripts a, b, c, and so forth represent that the members or parts referred to by reference numerals accompanied by the subscripts are identical to one another. Such subscripts are omitted in the description below if not particularly required.

The sensor node 100 sends data acquired by use of the sensor to the base station 101. The base station 101 manages a number of sensor nodes 100, and gathers data from the sensor nodes 100. The data so gathered are sent to the server 103 through the network 102 and then stored in the database 104 inside the server 103. The server 103 analyzes the data stored in the database 104. The analyzed data and data stored in the database 104 can be accessed from the terminal 105.

Figure 2:
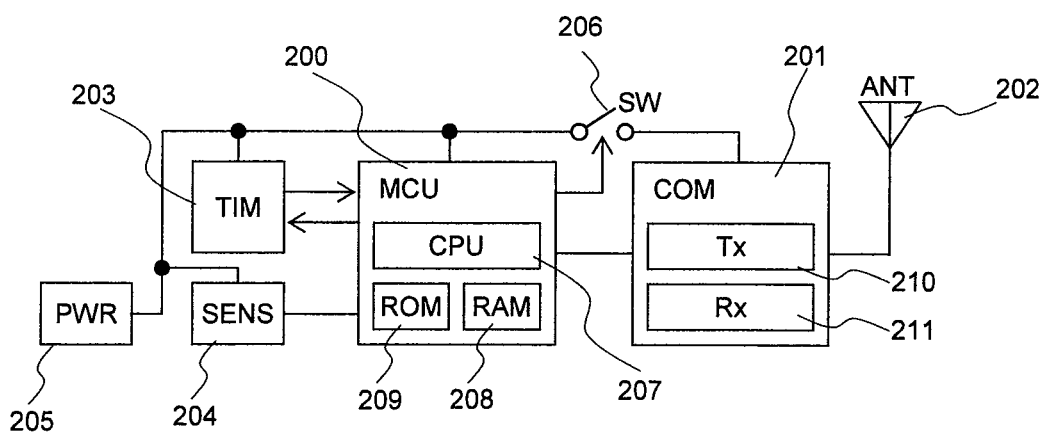
FIG. 2 is a block diagram showing a sensor node, which is a comparative example to a sensor node in connection with the invention.

FIG. 2 shows an example of a sensor node for comparison with the sensor node in connection with the invention. The sensor node involved in the comparative example includes: a micro controller unit (MCU) 200; a radio communication device (COM) 201; an antenna (ANT) 202; a timer (TIM) 203; a sensor (SENS) 204; a power source (PWR) 205; and a switch (SW) 206. MCU includes a central processing unit (CPU) 207; a volatile memory (RAM) 208; and a nonvolatile memory (ROM) 209. The radio communication device 201 includes a transmitter (Tx) 210 and a receiver (Rx) 211.

The MCU 200 captures data from the sensor 204. The sensor 204 is used to gauge its surrounding environment. Examples of the sensor 204 include a temperature sensor, a humidity sensor, an illumination sensor, an acceleration sensor, an infrared sensor and a barometric sensor. The MCU 200 processes data captured from the sensor 204 on an as-needed basis, and sends out the data to the base station 101 through the transmitter 210 in the radio communication device 201. The receiver 211 receives data from the base station 101. The data received from the base station 101 are analyzed in the MCU 200, and are subjected to a processing such as data retransmission on an as-needed basis.

As the power source 205 of the sensor node 100, a battery is often used to eliminate the need for wiring. It is desired that the sensor node is compact. Therefore, a battery which can be used therefor should be small one, and it becomes necessary to reduce the power consumption of the sensor node. Examples of methods which have been conventionally used as means for reducing the power consumption include: a method by which e.g. in the case where the radio communication device 201 is not used, MCU 200 turns off the switch 206, and cuts the power source of the radio communication device 201, thereby reducing the power consumption.

Known as another means for reducing the power consumption is a method by which MCU is made to transition to its standby mode in the case where MCU processing is not required. After having set the time for which MCU 200 is to remain on standby on the timer 203 in advance, MCU 200 is made to transition to the standby mode, in which the power consumption is kept lowered. After elapse of the time set on the timer 203, the timer 203 sends a control signal to MCU 200. Then, MCU 200 is restored to its active state from the standby state. After having been restored to the active state, MCU 200 performs processes including data acquisition from the sensor 204, and communication with a base station 101 through the radio communication device 201. Now, it is noted that the standby state refers to a state in which an unwanted clock inside MCU is stopped, whereby MUC power consumption is kept lowered. By exercising the control like this, a conventional sensor node makes its power consumption lower.

However, the reduction of power consumption achieved by the above method of reducing power consumption, namely the method of making MCU 200 transition to the standby state, is sometimes insufficient. Specifically, e.g. an application software program such that a sensor node conducts various processes needs to use a high-performance MCU. With such high-performance MCU, even if MCU transitions to the standby state, sometimes the effect of reduction of power consumption cannot be achieved sufficiently because of a large current leakage. In addition, the scaling down of semiconductor manufacturing processes is going ahead with each passing year. For example, in the case of using MCU fabricated by a manufacturing process designed for fine semiconductors, the amount of a leak current in the standby state, e.g. subthreshold leak current, is becoming unignorable.

Figure 3:
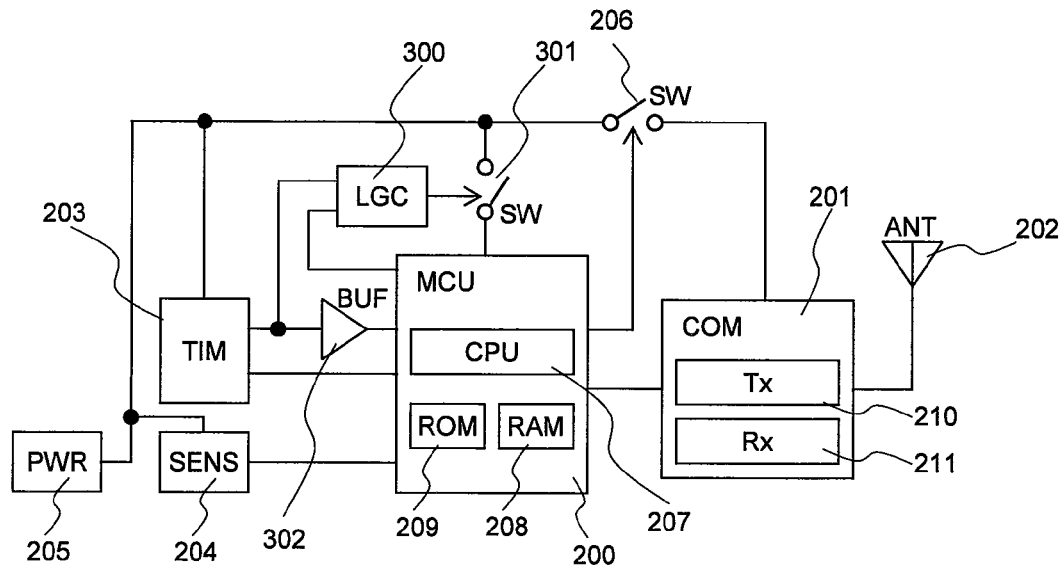
FIG. 3 is a block diagram showing an example of the sensor node in connection with the invention.

Therefore, in the invention, the sensor node 100 is arranged so as to eliminate a leak current, and to achieve the effect of reduction of power consumption sufficiently even in the case of using a high-performance MCU or MCU manufactured by a microfabrication process. FIG. 3 shows an example of the sensor node 100 in connection with the invention. The sensor node 100 includes: a micro controller unit (MCU) 200; a radio communication device (COM) 201; an antenna (ANT) 202; a timer (TIM) 203; a sensor (SENS) 204; a power source (PWR) 205; a switch (SW) 206; a switch (SW) 301; a logic circuit (LGC) 300; and a buffer circuit (BUF) 302. MCU 200 includes: a central processing unit (CPU) 207; a volatile memory (RAM) 208; and a nonvolatile memory (ROM) 209. The radio communication device 201 has a transmitter (Tx) 210 and a receiver (Rx) 211.

The sensor node shown in FIG. 3 performs a sensing action and communication with the base station 101 like the sensor node involved in the comparative example shown in FIG. 2. Specifically, MCU 200 processes data captured by the sensor 204 into an appropriate format, the resultant data is sent to the base station 101 from the transmitter 210. Data from the base station 101 is received by the receiver 211 and processed by MCU 200. If the radio communication device 201 is not used, MCU 200 controls the switch 206 to cut the power supply to the radio communication device 201, thereby reducing the power consumption.

The sensor node shown in FIG. 3 differs from the sensor node of the comparative example of FIG. 2 in that it has the logic circuit 300, switch 301 and buffer circuit 302. The switch 301 is placed in a power supply line for MCU 200, and controlled by the logic circuit 300 in switching. Signals from the MCU 200 and timer 203 are input to the logic circuit 300. The buffer circuit 302 is located in a control signal transmission line extending from the timer 203 to MCU 200. Now, the actions of the sensor node shown in FIG. 3 will be described with reference to FIGS. 4 to 8.

Figure 4:
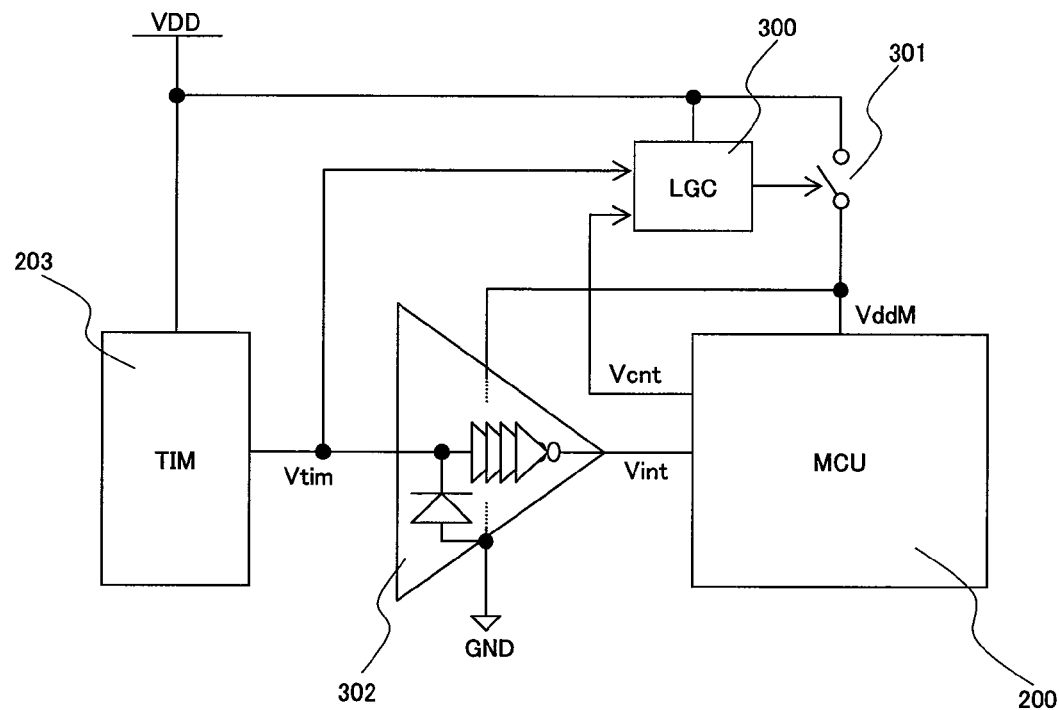
FIG. 4 is a block diagram showing the first example of a control circuit included in the sensor node as shown in FIG. 3.

Now, a control circuit constituting a part of the sensor node 100 shown in FIG. 3 will be described in detail with reference to FIG. 4. As shown in the drawing, the control circuit includes the MCU 200, timer 203, logic circuit 300, switch 301 and buffer circuit 302, in which VDD denotes a power-source line; VddM denotes a line for supply of power source to MCU 200; Vtim denotes a control signal output from the timer 203; Vint denotes a control signal supplied to MCU 200 from the buffer circuit 302 to which the control signal Vtim is input; and Vcnt denotes a control signal which MCU 200 inputs to the logic circuit 300.

The control signal Vcnt is activated in case that the power source VDD is cut by the switch 301. The control signal Vtim is activated at time when the timer 203 times out. The control signal Vint is one for ordering an interruption used as a trigger to restore MCU 200 from the standby state. This configuration enables not only transition of MCU 200 to the standby state, but also cutting the power source of MCU 200. These actions will be described below.

FIG. 5 is an operation timing chart of the sensor node 100. As in the sensor node involved in the comparative example, MCU 200 can transition to the standby state. Specifically, the sensor node works according to the sequence as described below. MCU 200 sets the time for which MCU 200 is to remain on standby on the timer 203, and then transitions to the standby state. The timer 203 measures the standby time of MCU. After an elapse of the set standby time, the timer 203 causes the control signal Vtim to fall down. The control signal Vtim is passed on to the buffer circuit 302, and then input, as the signal Vint, to MCU 200. When detecting the falling of the signal Vint, MCU 200 transitions from the standby state to the active one.

In the case of cutting the power source of MCU 200, the control for that is made as follows. MCU 200 sets, on the timer 203, the time for which MCU 200 is to remain on standby. Then, MCU 200 changes the control signal Vcnt from High (Hi) level to Low (Lo) level. The signal Vcnt is passed on to the logic circuit 300, and then the switch 301 is turned off. Thus, supply of the power source VddM to MCU 200 is cut. Also, the power source of the buffer circuit 302 is connected together with the power source VddM of MCU 200, and therefore the signal Vint, which is an output signal from the buffer circuit 302, is changed from High level to Low level in response of cutoff of the power source VDD by the switch 301. In this way, the MCU 200 and buffer 302 are brought to a power-source cutoff state.

The sequence of restoration from the power-source cutoff state to the active state is as follows. The timer 203 measures the standby time of MCU. Then, after an elapse of the previously set standby time, the timer 203 causes the control signal Vtim to fall down. The control signal Vtim is input to the logic circuit 300. Then, the logic circuit 300 turns on the switch 301. As a result, the power source is supplied to MCU 200, and thus MCU 200 can be restored to the active state.

At the time of cutoff of power source of MCU 200, it is necessary to make input and output pins of MCU 200 Low level. In other words, a protection circuit is connected to input and output pins of MCU typically. The protection circuit is intended for protecting an internal circuit of MCU by means of forcing a current to pass through a protection diode in the case where the voltage supplied to the input pin exceeds the voltage of a power source terminal. For example, diodes are disposed e.g. between an input pin and power-source terminal and between the input pin and power-source terminal so that they are connected reversely to each other in direction in a typical power-supplying condition. Therefore, at the time of cutting the power source of MCU 200, it is necessary to bring the input pin to Low level. To ensure this, the buffer circuit 302 is arranged.

At the time of cutting the power source of MCU 200, the output signal Vtim from the timer 203 is at High level. Therefore, if the signal line for the signal Vtim is connected to MCU 200 directly, the voltage of the input pin of MCU 200 exceeds the voltage of the power-source terminal of MCU 200, a large current would flow into the protection circuit located in MCU 200, from the input pin toward the power-source terminal. On this account, the buffer circuit 302 is placed between the timer 203 and MCU 200, thereby to prevent a high-level voltage from being applied to the input pin of MCU 200. The buffer circuit 302 has an input tolerant property. The input tolerant property refers to a trait such that a large current never flows even if a voltage higher than the source voltage is input. More specifically, the input tolerant property refers to a trait such that a large current never flows toward the power-source terminal even in the case where High level voltage is input to the input pin in the condition where e.g. a structure which does not have diodes for internal circuit protection between the input pin and power-source pin is embraced, and no source voltage is supplied to MCU. Even in the case where the output from the timer 203 is at High level, if the power source VddM is cut, the output Vint of the buffer circuit 302 is at Low level because of using such buffer circuit 302. Therefore, during the time when MCU 200 is in the power-source cutoff state, the input pin Vint of MCU 200 can be made Low level.

In the case where no power source is supplied to MCU 200, the output terminal of the MCU 200 is at Low level. Therefore, the control signal Vcnt sent from MCU 200 to the logic circuit 300 has a polarity such that the control signal is at Low level during the time when the power source of MCU 200 remains cut. If the control signal Vcnt has a polarity opposite to this, the polarity of the control signal Vcnt will be changed during the time when the power source remains cut, and therefore it will be impossible to cut the power source properly.

Even in the case where the control signal Vtim from the timer 203 is reversed in polarity, if the buffer circuit 302 is not incorporated, the following disadvantage will be brought about. First, considered is a case in which the control signal Vtim from the timer 203 stays at Low level during the time when the power source remains cut, and the control signal Vtim is made to transition to High level after having measured the standby time. In this case, during the time when the control signal Vtim stays at Low level, the input pin of MCU 200 is at Low level, and a large current never flows into the input protection diode of MCU 200. If the timer 203 turns the control signal Vtim to High level after having measured the standby time, a voltage of High level will be supplied to the input pin of MCU 200 before the power source is provided to MCU 200. Then, the voltage applied to the input pin of MCU 200 exceeds the source voltage, and a large current will flow into the protection diode. Therefore, as described here, the buffer circuit 302 is required even in a case that the polarity of the control signal Vtim from the timer 203 is reversed.

FIG. 6 shows relations of the polarity of the control signal Vtim sent from the timer 203 to MCU 200, the polarity of the control signal Vcnt sent from the MCU 200 to the logic circuit 300, the state of the switch 301, and the working state of MCU 200. In the case where both the signals Vtim and Vcnt are at Low level, or the case where the signal Vtim is at Low level and the signal Vcnt is at High level, the switch 301 is turned on, whereby MCU 200 is put in action. Bringing the signal Vcnt to Low level with the signal Vtim at High level turns off the switch 301, and thus the power source for the MCU 200 is cut. To put MCU 200 in standby state, the signal Vcnt is brought to High level to supply the power source to the MCU 200. In addition, the output Vtim from the timer 203 is made High level to measure the standby time.

FIG. 7 shows specific examples of the logic circuit 300 and switch 301. The logic circuit 300 includes an inverter 700 and an AND circuit (logical AND circuit) 701. The switch 301 includes a PMOS switch 702 formed from a P-channel MOS transistor. This circuit structure enables the switch 301 to be controlled according to the truth values shown in FIG. 6. The logic circuit 300 needs to work during the time when the power source of MCU 200 is cut. Therefore, connected with the logic circuit 300 as the power source thereof is not the power source VddM, but the power source VDD, by which a constant power supply can be provided.

Figure 8:
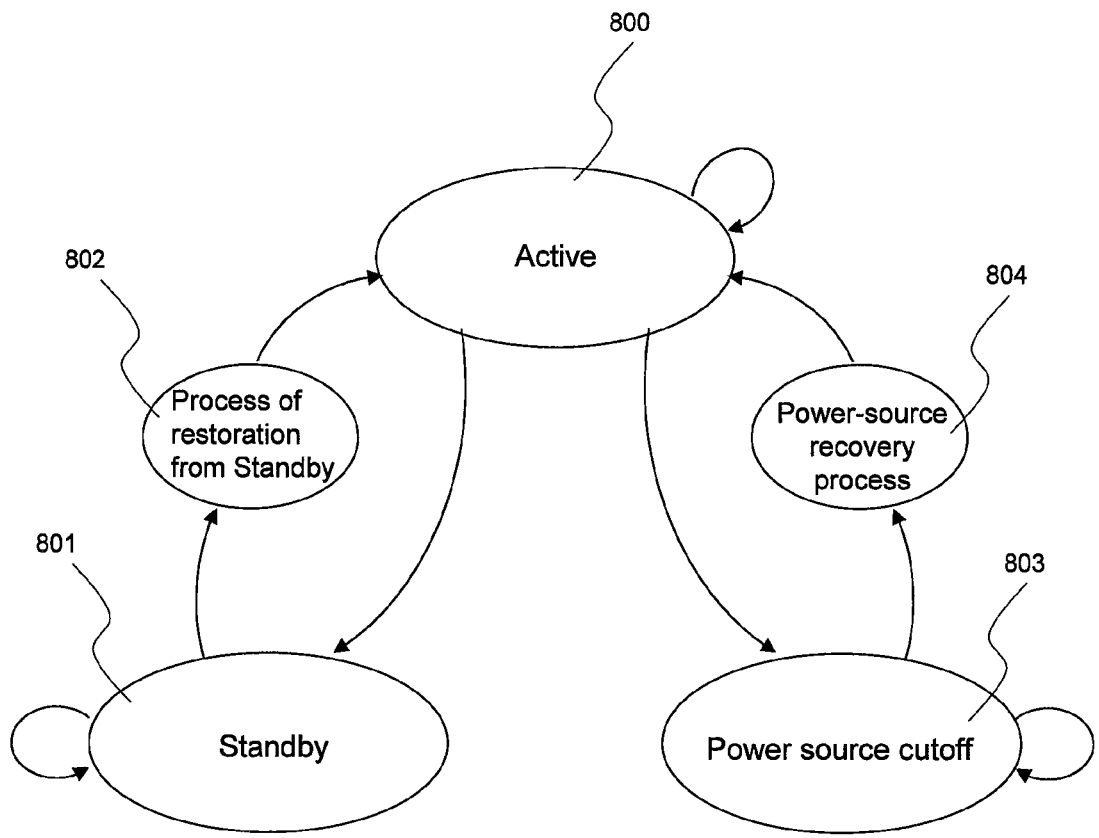
FIG. 8 is a diagram showing the transition of state of MCU 200.

FIG. 8 presents a diagram showing the transition of state of MCU 200. If MCU 200 needs not work, MCU 200 is made to transition from the active state 800 to the standby state 801.

On receipt of the control signal Vtim from the timer 203 serving as a trigger, MCU 200 transitions from the standby state 801 to the active state 800 through the restoration process 802. In the case of cutting the power source, MCU 200 is made to transition to the power-source cutoff state 803 by means of control of the control signal Vcnt. In response to the control signal Vtim from the timer 203 serving as a trigger, the power source is supplied to MCU 200 and as such, MCU 200 is made to transition to the active state 800 after implementation of the power-source recovery process 804.

As described above, it is possible to make MCU 200 transition to the standby state 801 or power-source cutoff state 803 if MCU 200 is not used. Further, the trigger used at the time of restoration from the standby state 801 to the active state 800, and the trigger used at the time of restoration from the power-source cutoff state 803 to the active state 800 are identical; the control signal Vtim serves as such triggers. Therefore, unlike the sensor node involved in the comparative example, in which MCU is made to transition only to the standby state, MCU can be made to transition to the power-source cutoff state as well as the standby state in the sensor node in connection with the invention.

With the sensor node in connection with the invention, the power source of MCU 200 can be cut. Therefore, it becomes possible to eliminate a leak current in connection with MCU 200. Also, it becomes possible to further reduce the power consumption when MCU 200 is out of use in comparison to the sensor node involved in the comparative example. By arranging a buffer circuit having an input tolerant property between the timer and MCU, it becomes possible to suppress the occurrence of the current leakage thereby to reduce the power consumption by the sensor node during the time when MCU stays in the power-source cutoff state or the time until the power supply is stabilized after the cancel of power cutoff. That is, while directly supplying an interrupt signal to an interrupt terminal of a micro controller unit can cause a leak current regardless of whether the interrupt signal is High-enable or Low-enable one, the occurrence of such leak current can be suppressed.

Further, by adoption of the sensor node in connection with the invention, it becomes possible to selectively make MCU 200 transition to the standby state 801, or to the power-source cutoff state 803 at the time when MCU 200 is out of use. Thus, it becomes possible to select a condition which can further reduce the power consumption depending on the standby time. The reason for this will be described with reference to FIG. 9.

Figure 9:
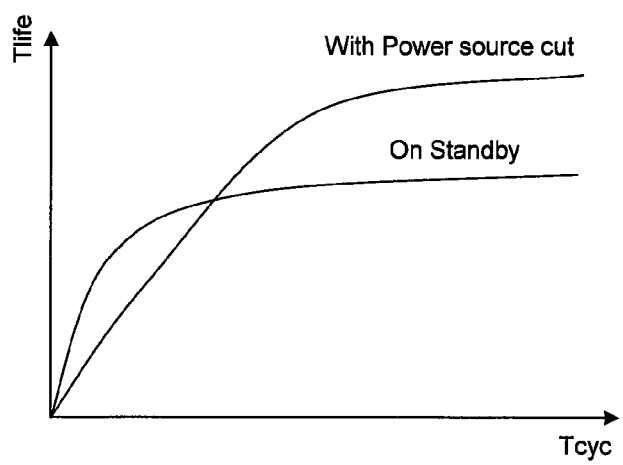
FIG. 9 is a graph of characteristic curves showing relations between the life of a battery of the sensor node and the operation cycle.

FIG. 9 is a graph of characteristic curves showing relations between the life of a battery of the sensor node and the operation cycle. In the drawing, an operation cycle (Tcyc) of the sensor node is taken for the horizontal axis; a battery life (Tlife) is taken for the vertical axis. The battery life (Tlife) can be estimated based on the following equation from a standby current (Is), an amount (Qa) of consumed electric charge in action, an operation cycle (Tcyc), and a battery capacity (Qb).

$$Tlife = Qb/(Is + Qa/Tcyc) \qquad \text{Eq. (1)},$$

where the operation cycle Tcyc is assumed to be fixed. Making a comparison between the case where MCU 200 is made to transition to the standby state 801, and the case where MCU 200 is made to transition to the power-source cutoff state 803, the following are clear. That is, the standby current Is is smaller in the transition to the power-source cutoff state 803 rather than the transition to the standby state 801. However, the amount Qa of consumed electric charge in action is smaller in the transition to the standby state 801 rather than the transition to the power-source cutoff state 803. This is because the power-source recovery process 804 takes a longer time than the restoration process 802 from the standby state typically. Therefore, when the battery life Tlife is estimated according to Eq. (1), results of estimation are as shown in FIG. 9. That is, with a short operation cycle Tcyc, the battery life is longer in the case of transition to the standby state 801. In contrast, with a long operation cycle Tcyc, the battery life is longer in the case of transition to the power-source cutoff state 803. This is because the amount Qa of consumed electric charge in action dominates in the condition of a short operation cycle Tcyc, whereas the standby current Is consumed on standby dominates in the condition of a long operation cycle Tcyc.

Hence, by selecting whether to transition to the standby state 801 or to the power-source cutoff state 803 according to the operation cycle, it becomes possible to reduce the power consumption further, and therefore the battery life Tlife can be made longer. If the battery life can be elongated, the frequency of battery replacements can be suppressed, and the cost for the system maintenance can be reduced. Further, assuming batteries identical in life, it becomes possible to use a smaller or more compact battery, whereby the downsizing of the sensor node can be achieved.

While in the above description, a case in which the operation cycle Tcyc is fixed has been explained, the operation cycle is not required to be fixed. The operation cycle is synonymous with standby time substantially. Therefore, in the condition of a short standby time, the transition to the standby state 801 shall be selected. In the condition of a long standby time, the transition to the power-source cutoff state 803 shall be selected. As a result, even when the operation cycle is not fixed, the power consumption can be reduced.

One of the advantages of the invention is that restorations of MCU from the standby state 801 and power-source cutoff state 803 to the active state 800 can be performed by the same control signal Vtim. In other words, signals exactly identical to each other can be used as trigger signals for restorations from the standby state 801 and power-source cutoff state 803 to the active state 800. Therefore, the setting of the timer 203 may be unchanged regardless of whether to make MCU transition to the standby state or the power-source cutoff state.

Incidentally an example in which the control signal Vtim from the timer 203 is used as a trigger to restore MCU to the active state 800 has been explained. However, the invention is not limited to the example. For instance, a system such that a signal from the sensor 204 is used as a trigger to restore can be arranged. Taking an example, an application such that when moving e.g. an object with a sensor node attached thereto, an output from a vibration sensor of the sensor node is used as a trigger to restore MCU to its active state is conceived. In such application, it is possible to perform sensing, data communication, and other actions. Using the control circuit of the invention in the application like this, if an object with a sensor node is moved frequently, the reduction in power consumption is afforded by transition to the standby state; if not frequently, the reduction in power consumption can be achieved by transition to the power-source cutoff state. In other words, it is possible to achieve the reduction in power consumption by an optimum means according to a frequency with which an object with a sensor node is moved.

Figure 18:
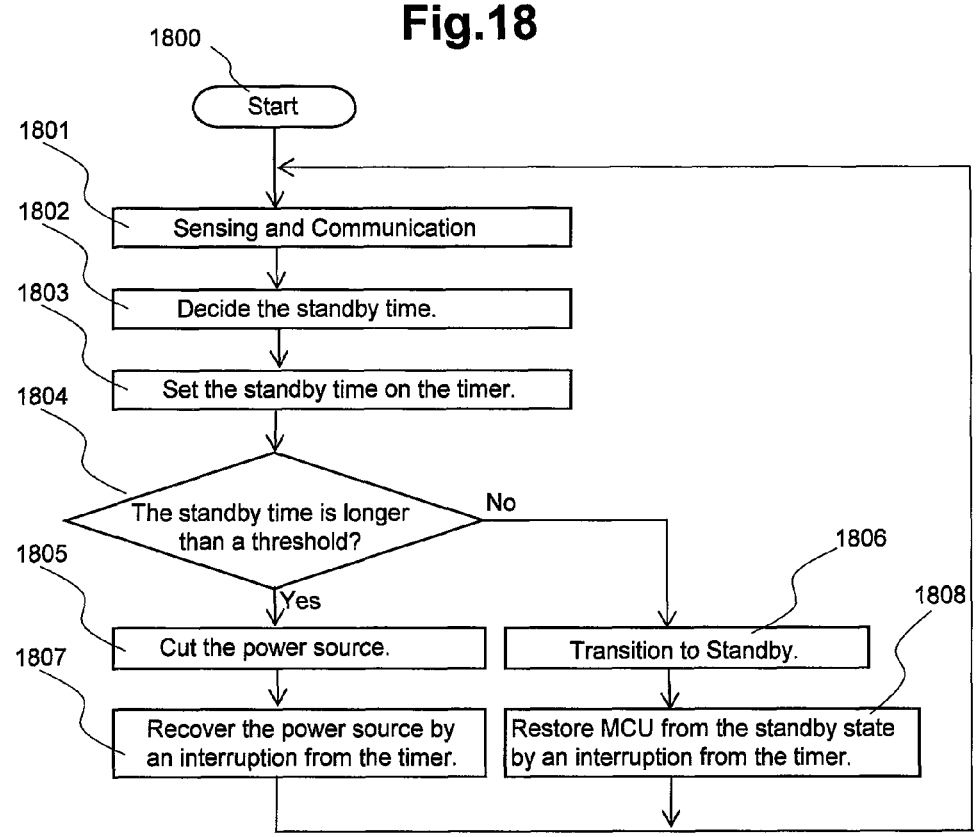
FIG. 18 is a flowchart showing an example of the action flow of the sensor node.

FIG. 18 presents a flowchart showing an example of the flow of actions of the sensor node. After start of working (1800), the sensor node performs actions such as sensing of its surrounding environment, and communication with a base station (1801). Then, the sensor node decides the standby time until implementation of a subsequent action (1802). The standby time is decided based on sensed information, information gained by communication or the like by a method which has been programmed on MCU 200 in advance. The standby time thus decided is set on the timer 203 (1803). A judgment is made about whether the decided standby time is larger or smaller than a certain threshold (1804). In this judgment, whether or not the standby time is larger than the threshold is judged by e.g. a conditional branch instruction. Then, which of the following is to be performed is decided according to the result of the judgment: the process for cutting the power source; and the process for transition to the standby state. The threshold is a time corresponding to the intersection of the power source cutting and the transition to standby as shown in FIG. 9, which has been set on MCU 200 in advance. Otherwise, the threshold may be decided through communication with a base station. If the standby time thus decided is larger than the threshold, MCU 200 selects the power source cutting (1805); if it is smaller than the threshold, MCU 200 selects the transition to standby (1806). If the power source of MCU 200 has been cut, the power source is recovered by a signal from the timer 203 after an elapse of a predetermined standby time (1807). Similarly in the case of MCU staying on standby, MCU is restored from the standby state by a signal from the timer 203 after an elapse of the predetermined standby time (1808). A series of the actions is performed repeatedly.

By comparing the standby time with the threshold to select whether to cut the power source or to make MCU transition to the standby state in this way, the means which can further reduce the power consumption can be selected. Thus, it becomes possible to elongate the life of a battery as far as possible.

<<Second Embodiment>>

Figure 10:
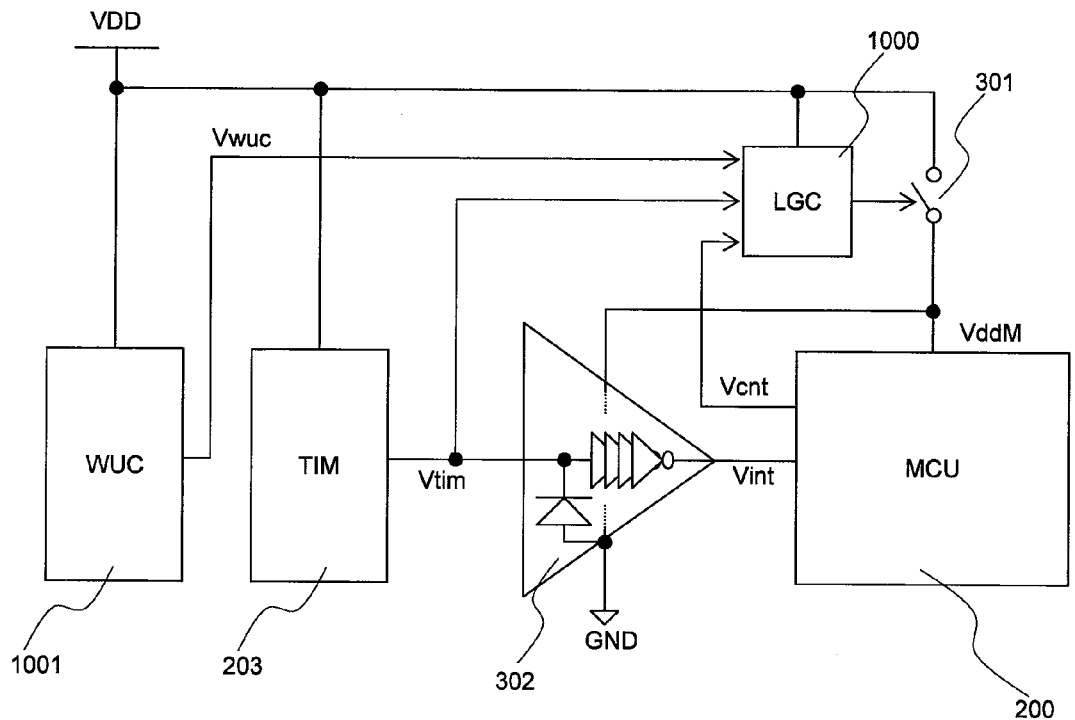
FIG. 10 is a diagram showing the second example of the control circuit included in the sensor node.

Now, a sensor node in connection with the second embodiment of the invention will be described with reference to FIGS. 10 to 15. FIG. 10 shows another example of the control circuit included in the sensor node 100. The control circuit shown in the drawing includes: an MCU 200; a timer 203; a logic circuit 1000; a switch 301; a buffer circuit 302; and an activation circuit (WUC) 1001. In the drawing, VDD denotes a power-source line; VddM denotes a line for supply of power source to MCU 200; Vtim denotes a control signal output from the timer 203; Vint denotes a control signal input to MCU 200 after the signal Vtim has traveled through the buffer circuit 302; Vcnt denotes a control signal which MCU 200 inputs to the logic circuit; and Vwuc denotes a control signal input to the logic circuit 1000 from the activation circuit 1001.

Figure 11:
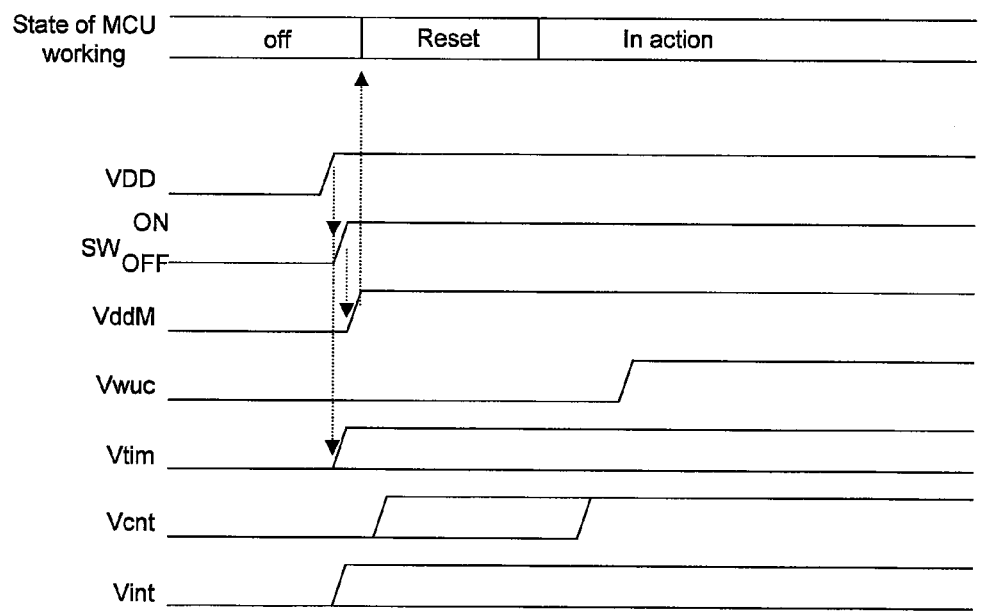
Figures 12, 13:
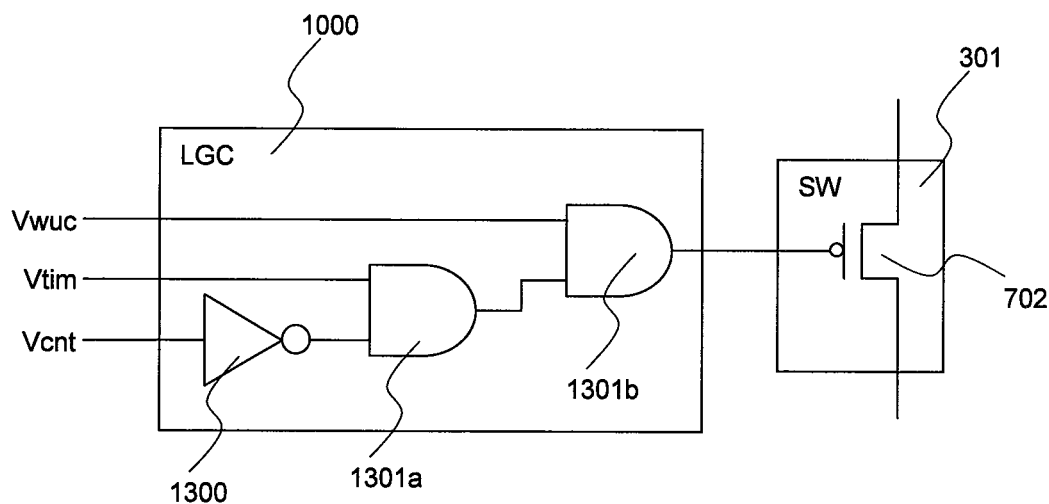
FIG. 12 is a table for explaining truth values in connection with the control circuit of FIG. 10.
FIG. 13 is a diagram showing specific examples of a logic circuit and a switch included in the control circuit of FIG. 10.

The control circuit shown in FIG. 10 is a circuit to ensure the supply of power source to MCU 200 at power-on of the sensor node. It is necessary to supply MCU 200 with the power source at power-on of the sensor node. In other words, the switch 301 must be turned on. The switch is controlled by the logic circuit 1000. Therefore, the control to turn on the switch 301 at power-on is conducted at power-on by supplying the output Vwuc from the activation circuit 1001 to the logic circuit 1000. FIG. 11 presents a timing chart at power-on. FIG. 12 shows correspondences between truth values of signals input to logic circuit 1000 the and ON and OFF of the switch 301. The activation circuit 1001 detects a leading edge of the power source VDD, keeps outputting at Low level for a fixed length of time after the leading edge of the power source VDD. As a result, the logic circuit 1000 controls the switch 301 to ON. As the switch 301 is turned on, the power source VddM of MCU 200 is set up, and provided to MCU 200. Thus, MCU 200 performs a reset process at power-on and then goes into the normal active state. After having entered the active state, MCU 200 controls the control signal Vcnt to High level, whereby the switch 301 is turned on. After that, the output Vwuc of the activation circuit 1001 is changed to High level, and the control circuit is put in a condition such that the output of the logic circuit 1000 is controlled by the output Vcnt of MCU 200 and the output of the timer 203. The time during which the activation circuit 1001 keeps its output signal Vwuc at Low level is set to be longer than a time during which the control signal Vcnt can be controlled after the completion of reset of MCU 200.

FIG. 13 shows specific examples of the logic circuit 1000 and switch 301. The logic circuit 1000 includes a inverter 1300, and AND circuits 1301a and 1301b. The switch 301 includes a PMOS switch 702. Such circuit configuration enables control of the switch 301 by use of the truth values shown in FIG. 12. The logic circuit 1000 needs to be in action at the time of cutting the power source of MCU 200, and therefore not the power source VddM, but VDD is connected for the power source of the logic circuit.

Figure 14:
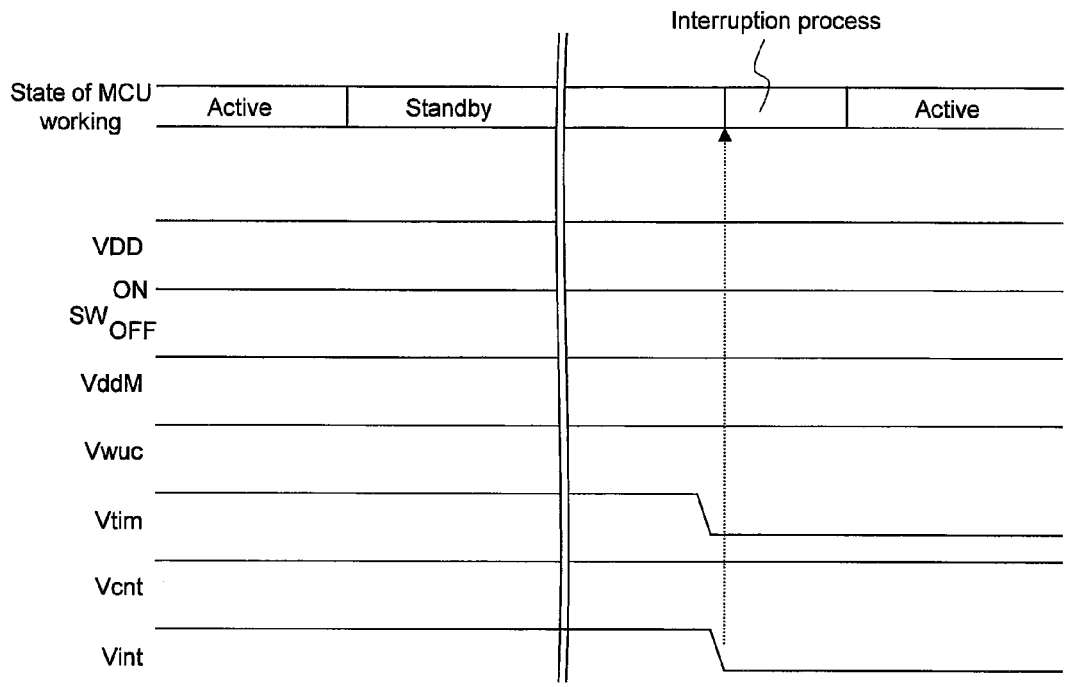
FIG. 14 is a timing chart of the control circuit of FIG. 10 at the time of transition to its standby state.

Using the activation circuit 1001 in this way, it becomes possible to ensure the power source of MCU 200 at power-on. Also, as in the case of the first embodiment, the standby state and the power-source cutoff state can be switched to each other. FIG. 14 presents a timing chart at the time of making MCU 200 transition to the standby state. MCU 200 sets the time for which MCU 200 is to remain on standby on the timer 203 in advance. Then, MCU 200 transitions to the standby state. After an elapse of the standby time set on the timer 203, the timer 203 causes the control signal Vtim to fall down. The control signal Vtim is passed on to the buffer circuit 302, and then input, as the control signal Vint, to MCU 200. When detecting the falling of the control signal Vint, MCU 200 transitions from the standby state to the active one.

Figure 15:
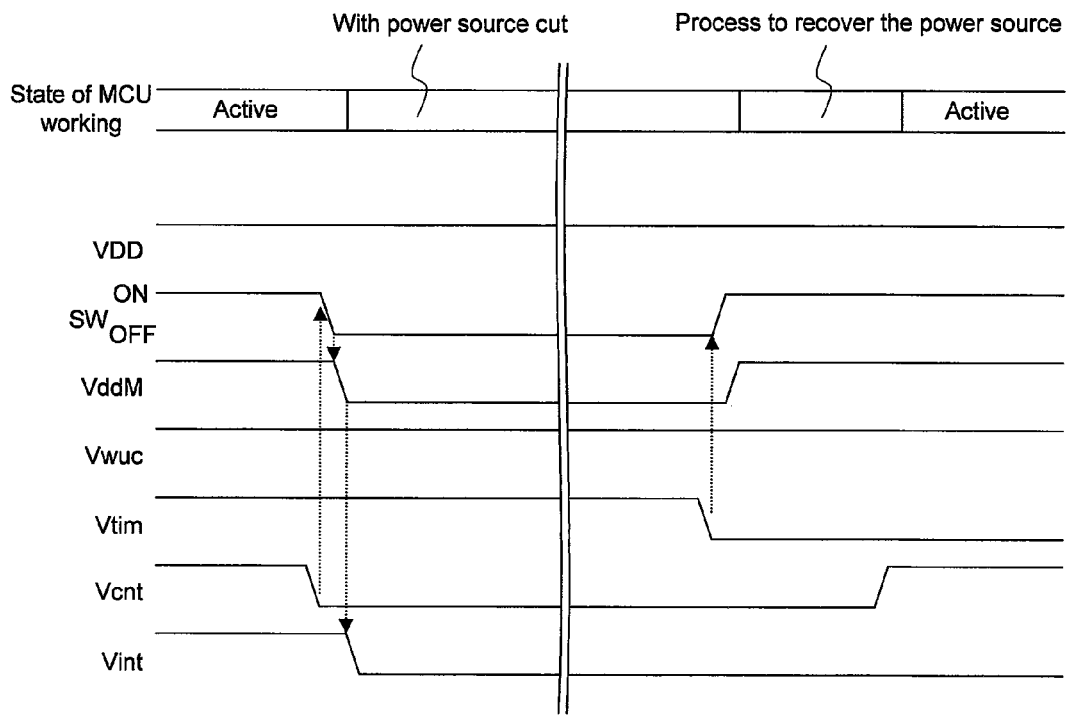
FIG. 15 is a timing chart of the control circuit of FIG. 10 at the time of transition to the power-source cutoff state.

FIG. 15 presents a timing chart at the time of cutting the power source of MCU 200. MCU 200 sets, on the timer 203, the time for which MCU 200 is to remain on standby. After that, MCU 200 changes the control signal Vcnt from High to Low level. The control signal Vcnt turns off the switch 301 through the logic circuit 300. Thus, supply of the power source VddM to MCU 200 is cut. The power source of the buffer circuit 302 is connected with the power source VddM of MCU 200, and therefore the control signal Vint, which is an output signal from the buffer circuit 302, is made to transition from High to Low level. After an elapse of the standby time, which has been set on the timer 203 in advance, the timer 203 causes the control signal Vtim to fall down. The control signal Vtim is input to the logic circuit 300, and then the logic circuit 300 turns on the switch 301. As a result, MCU 200 is supplied with the power source, whereby MCU 200 goes into the active state.

As described above, also in the second embodiment, the buffer circuit 302 ensures that the input pin of MCU 200 for accepting the control signal Vint is brought to Low level at the time of cutting the power source of MCU 200. Thus, it becomes possible to selectively make MCU 200 transition to the standby state, or to the power-source cutoff state. Besides, using the activation circuit 1001, it is possible to perform control so that MCU 200 is fed with the power source at power-on of the sensor node.

<<Third Embodiment>>

Figure 16:
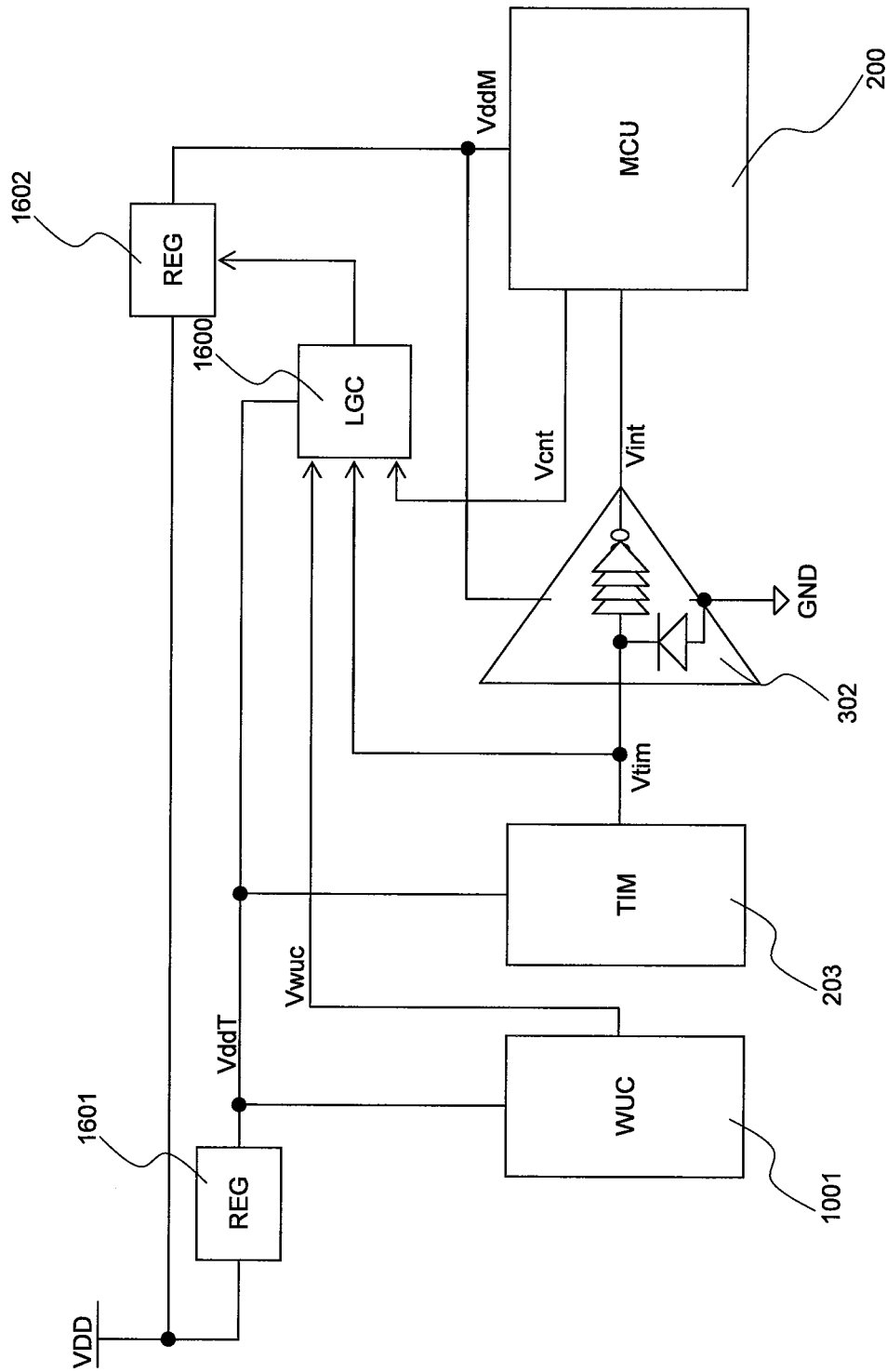
FIG. 16 is a diagram showing the third example of the control circuit included in the sensor node.

FIG. 16 shows another example of the control circuit included in the sensor node 100. The control circuit shown in FIG. 16 includes: an MCU 200; a timer 203; a logic circuit 1600; a switch 301; a buffer circuit 302; an activation circuit 1001; a regulator 1601; and a regulator 1602. In the drawing, VDD denotes a power-source line; VddM denotes a line for supply of power source to the MCU 200 and buffer circuit 302; VddT denotes a line for supply of power source to the timer 203, activation circuit 1001 and logic circuit 1600; Vtim denotes a control signal output from the timer 203; Vint denotes a control signal input to MCU 200 after the signal Vtim has traveled through the buffer circuit 302; Vcnt denotes a control signal which MCU 200 inputs to the logic circuit; and Vwuc denotes a control signal input to the logic circuit 1600 from the activation circuit 1001.

The control circuit shown in the drawing materializes a function comparable to that of the control circuit of FIG. 10, however it differs from the control circuit of FIG. 10 in that it has two types of regulators 1601 and 1602. The regulator 1601 provides a power source to the activation circuit 1001, timer 203 and logic circuit 1600. The regulator 1602 supplies a power source to the MCU 200 and buffer circuit 302. The logic circuit 1600 controls the regulator 1602 to turn ON/OFF the power source VddM of the MCU 200 and buffer circuit 302. The regulators are used for supplying a stable voltage. A stabilized power source is necessary for e.g. an analog-to-digital converter operable to convert analog data from a sensor into digital data. In addition, to draw out the best performance of the radio communication device, sometimes a stable power source is required. In the case of using regulators as in the example of FIG. 16, directly controlling ON and OFF of the regulator 1602 from the logic circuit 1600 can eliminate the need for a switch.

In communication between the timer 203 and MCU 200, it is preferable that the power sources VddT and VddM are identical in voltage value. Hence, the two regulators 1601 and 1602, which output identical voltages to each other, are used.

The regulator 1601 is used to operate only a device, such as the timer 203, which consumes a small power, and therefore it may be a regulator whose output current is small. In general, a regulator small in output current consumes a small current. Therefore, to reduce the power consumption of the sensor node, the regulator 1601 which consumes a small current is used. In contrast, the regulator 1602 serves to supply a power source to MCU 200 whose power consumption is relatively large. Therefore, a regulator which outputs a large current must be used as the regulator 1602. With such regulator which outputs a large current, current consumed by the regulator 1602 per se is relatively large. Hence, the regulator 1602 is also turned off at the time of cutting the power source of MCU 200, thereby reducing the power consumption on standby.

Using regulators as shown in the example of FIG. 16, it becomes possible to supply a power source of a stable and fixed voltage. In addition, the need for a switch is eliminated by controlling ON and OFF of the regulator 1602 from the logic circuit 1600. The regulator 1602 is turned off at the time of cutting the power source, which makes it possible to reduce the power consumption. Further, the regulator 1601 and regulator 1602 are arranged to output identical voltages, whereby the voltages of input and output pins can be coincident with each other in communication between the timer 302 and MCU 200. In this case, the current output by the regulator 1601 may be small, and therefore a regulator whose power consumption is small may be used.

<<Fourth Embodiment>>

Figure 17:
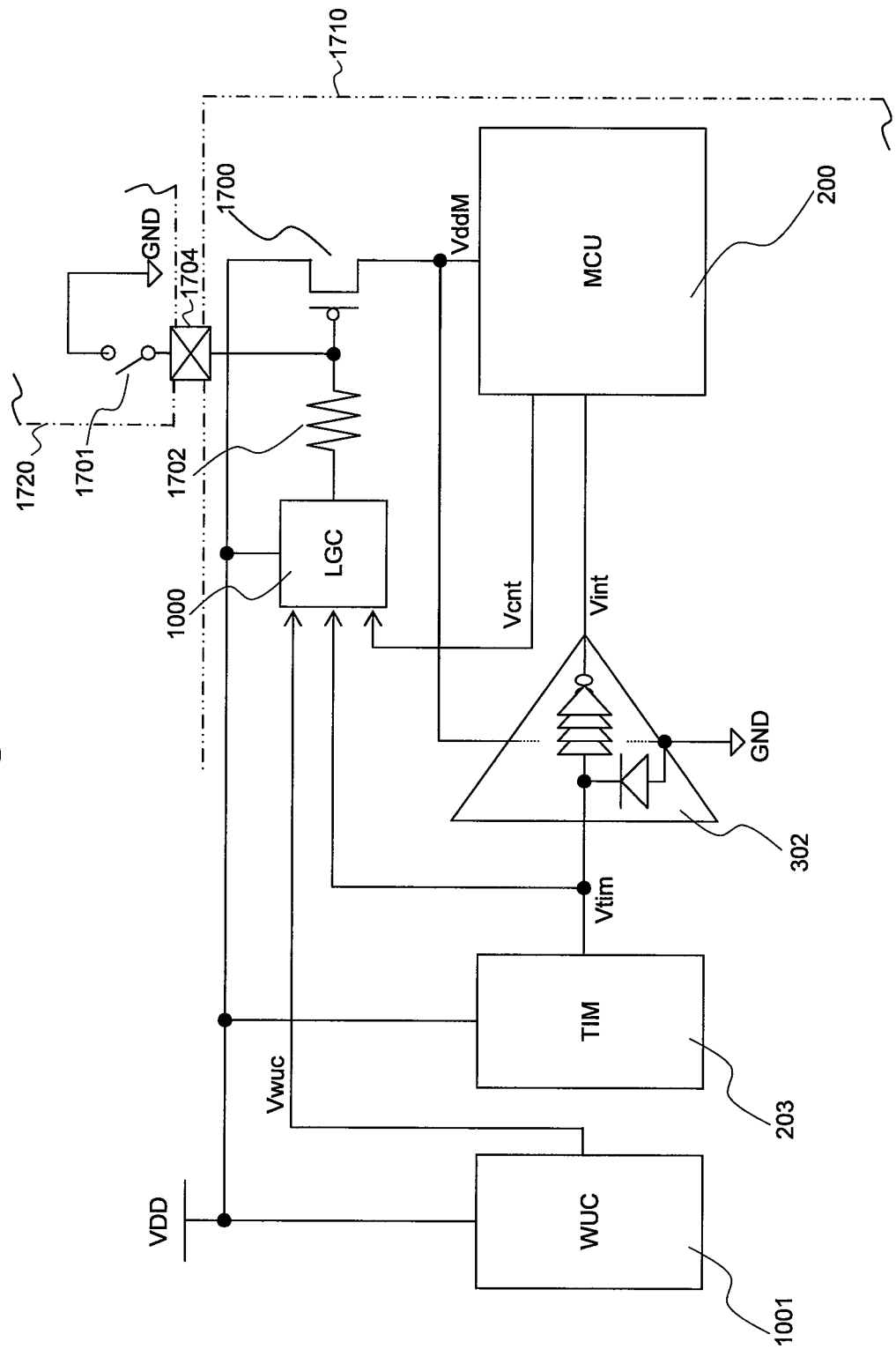
FIG. 17 is a diagram showing the fourth example of the control circuit included in the sensor node.

FIG. 17 shows still another example of the control circuit included in the sensor node 100. The control circuit shown in the drawing includes: an MCU 200; a timer 203; a logic circuit 1000; a buffer circuit 302; an activation circuit 1001; a PMOS switch 1700; a switch 1701; and a resistor 1702. The features of the control circuit of FIG. 17 in structure are the switch 1701 and resistor 1702.

The switch 1701 is used only to turn on the PMOS switch 1700 independently of an output from the logic circuit 1000. The output of the logic circuit 1000 depends on an output Vcnt from MCU 200. Therefore, in the case of supplying MCU 200 with a power source under a condition in which the output signal Vcnt of MCU 200 cannot be controlled, the switch 1701 is required. Specific examples of such case are the case of writing a program into an electrically-rewritable nonvolatile memory, e.g. a flash memory that MCU 200 has, and the case of connecting an emulator with MCU 200 to debug a program. In such cases, input and output pins of MCU 200 can be unstable, which can lead to instability of an output from the logic circuit 1000. On this account, it is necessary to turn on the PMOS switch 1700 independently of an output from the logic circuit 1000. When using the switch 1701 to bring the gate voltage of the PMOS switch 1700 to GND level, the PMOS switch 1700 can be turned on, whereby a source voltage can be provided to MCU 200. The resistor 1702 serves to prevent the control circuit from being directly connected to GND in the case of turning on the switch 1701 under the condition where an output from the logic circuit 1000 is at High level. With the aid of the resistor 1702, the control of the switch 1700 takes priority over the output by the logic circuit 1000, and therefore it becomes possible to control the PMOS switch 1700.

The switch 1701 like this is needed at times of downloading and debugging a program, however it is not required in normal use. Therefore, it is desirable, from the viewpoint of downsizing, to mount the switch 1701 on not a board for the main body of the sensor node, such as MCU 200, but a second board different from it. Specifically, a connector 1704 is mounted on a board 1710 for the main body of the sensor node; a line connected with a gate of the PMOS switch 1700 and a line of GND are led out from the connector 1704. On the second board 1720, the switch 1701 is mounted. The board 1710 for the main body of the sensor node and the board 1720 with the switch 1701 mounted thereon are connected with each other through the connector 1704 for debug. Thus, the main substrate on which the switch 1701 is not mounted can be used in normal use, and therefore a device can be scaled down. In addition, the number of parts on the main board for the sensor node can be reduced, and therefore the const can be cut. For example, assuming an emulation, the board 1710 makes one on which the sensor node is actually mounted, and the board 1720 serves as an emulation board. To the emulation board, an external terminal of MCU 200 is connected though an interface cable (not shown).

Adopting the configuration as shown in FIG. 17, it becomes possible to provide MCU 200 with a power source independently to an output from the logic circuit 1000. Further, by mounting the switch 1701 on the second board other than the main board, the downsizing of devices and the reduction in cost owing to the decrease in the number of parts or components are made possible.

<<Fifth Embodiment>>

Figure 19:
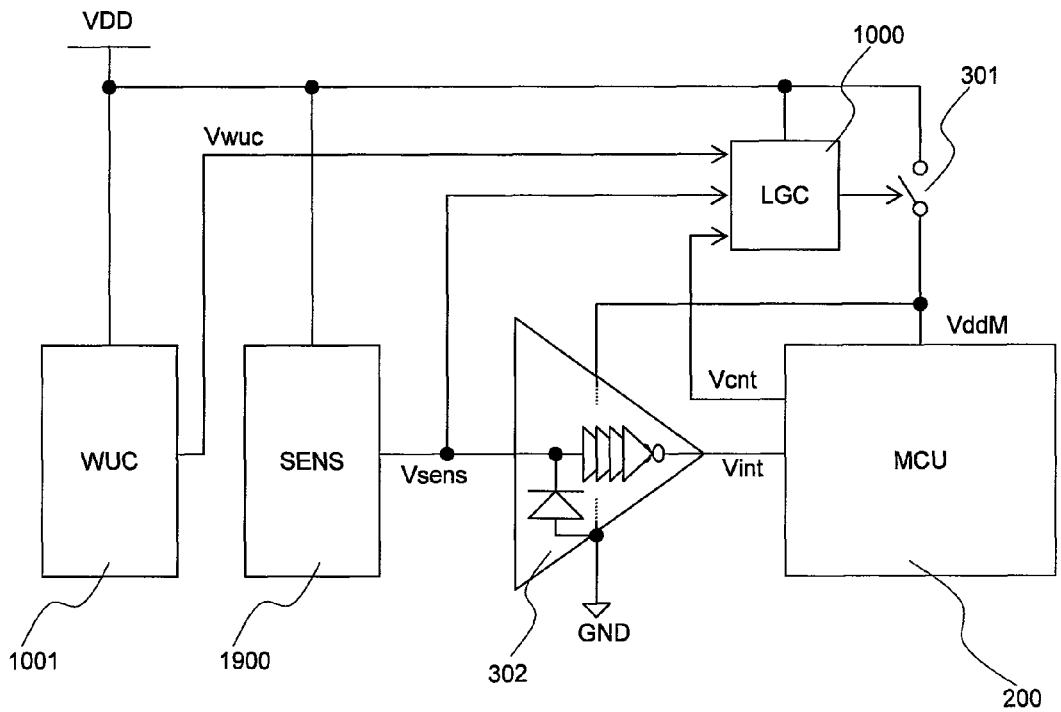
FIG. 19 is a diagram showing the fifth example of the control circuit included in the sensor node.

FIG. 19 shows still another example of the control circuit included in the sensor node 100. The control circuit shown in the drawing includes: an MCU 200; a sensor 1900; a sensor 1900; a logic circuit 1000; a switch 301; a buffer circuit 302; and an activation circuit 1001. In the drawing, VDD denotes a power-source line; VddM denotes a line for supply of power source to the MCU 200 and buffer circuit 302; Vsens denotes a control signal output from the sensor 1900; Vint denotes a control signal input to MCU 200 after the signal Vsens has traveled through the buffer circuit 302; Vcnt denotes a control signal which MCU 200 inputs to the logic circuit 1000; and Vwuc denotes a control signal input to the logic circuit 1000 from the activation circuit 1001.

The control circuit of FIG. 19 uses the sensor 1900 instead of the timer 203 used in the control circuit, which has been described above. As the sensor 1900, e.g. a vibration sensor, a temperature sensor, and a photosensor may be used. Taking a vibration sensor as an example, the description will proceed here. In this case, an output from the vibration sensor is used as a trigger to restore MCU from the power-source cutoff state or standby state to the active state. Conceived as an application thereof is that MCU is restored to the active state e.g. in the case that an object with the sensor node attached thereto is moved, and then the sensing or data communication can be performed. Using the control circuit of FIG. 19 in the application like this, if an object with a sensor node is moved frequently, the reduction in power consumption is afforded by transition to the standby state; if not frequently, the reduction in power consumption can be achieved by transition to the power-source cutoff state. In other words, it is possible to achieve the reduction in power consumption by an optimum means according to a frequency with which an object with a sensor node is moved.

Further, if using a temperature sensor, for instance, the sensor node can be made to work only at the time when the temperature changes. Otherwise, using a photosensor, an application such that the sensor node is made to work only when the brightness changes is possible.

While the invention made by the inventor has been specifically described above based on the embodiments thereof, the invention is not limited to the embodiments. It will be obvious that various changes and modifications may be made without departing from the scope hereof.

What is claimed is:

1. An electronic circuit, comprising:
   a micro controller unit;
   a timing-generation sensor operable to output a certain detection result;
   a buffer circuit which accepts an output of the timing-generation sensor;
   a logic circuit controlled by the output signal of the timing-generation sensor and an output of the micro controller unit; and
   a power-on switch controlled by the logic circuit in switching, and operable to supply a power source to the micro controller unit and the buffer circuit,
   wherein the buffer circuit has a diode connected to an terminal thereof on a ground side, no protection diode connected to an input terminal thereof on the power-source side, and has an input tolerant property, and
   the micro controller unit is made to transition from an active state thereof to one of standby and power-source cutoff states by the time that the timing-generation sensor outputs the certain detection result, and is restored from the one of the standby and power-source cutoff states to the active state according to an output from the buffer circuit,
   wherein the power-source cutoff state is not a same mode as the standby state, and a power supply from the power source to power supply terminals of the micro controller is stopped by switching off the power-on switch in the power-source cutoff state, and
   wherein power supply from the power-source to the power supply terminals of the micro controller is maintained in the standby state and the state thereof transitions from the standby state to the active state by using a control signal connected to a terminal of the micro controller other than the power supply terminals thereof.

2. The electronic circuit according to claim 1, further comprising:
   a sensor;
   a radio communication unit; and
   a power-on switch for radio communication, operable to control a power source of the radio communication unit,
   wherein the power-on switch for radio communication is controlled by the micro controller unit, and
   the radio communication unit transmits data from the sensor under control of the micro controller unit.

3. A radio communication system, comprising:
   a plurality of radio communication devices; and
   a host device which communicates with and manages the plurality of radio communication devices,
   wherein at least one of the plurality of radio communication devices is the electronic circuit according to claim 2.

4. An electronic circuit, comprising:
   a micro controller unit;
   a timer operable to measure a standby time under control of the micro controller unit;
   a buffer circuit operable to receive an output signal of the timer;
   a logic circuit controlled by the output signal of the timer and an output signal of the micro controller unit;
   a first regulator controlled by the logic circuit in its activation, and operable to supply a power source to the micro controller unit and buffer circuit; and
   a second regulator operable to supply a power source to the timer and logic circuit,
   wherein the buffer circuit has a diode connected to an input terminal thereof at a ground side, no protection diode connected to an input terminal thereof on a power-source side, and has an input tolerant property, and
   the micro controller unit is made to transition from an active state thereof to one of standby and power-source cutoff states during the standby time, and is restored from the one of the standby and power-source cutoff states to the active state according to an output from the buffer circuit,
   wherein the power-source cutoff state is not a same mode as the standby state, and power supply from the power source to power supply terminals of the micro controller is stopped by switching off the power-on switch in the power-source cutoff state, and
   wherein power supply from the power-source to the power supply terminals of the micro controller is maintained in the standby state and the state thereof transitions from the standby state to the active state by using a control signal connected to a terminal of the micro controller than the power supply terminals thereof.

5. The electronic circuit according to claim 4, further comprising:
   a sensor;
   a radio communication unit; and
   a power-on switch for radio communication, operable to control a power source of the radio communication unit,
   wherein the power-on switch for radio communication is controlled by the micro controller unit, and
   the radio communication unit transmits data from the sensor under control of the micro controller unit.

6. A radio communication system, comprising:
   a plurality of radio communication devices; and
   a host device which communicates with and manages the plurality of radio communication devices,
   wherein at least one of the plurality of radio communication devices is the electronic circuit according to claim 5.

* * * * *